United States Patent [19]

Clark

[11] 4,041,804
[45] Aug. 16, 1977

[54] LIMITED SLIP DIFFERENTIAL WITH CLUTCH CONTROL MEANS

[75] Inventor: Ralph B. Clark, Morton, Ill.

[73] Assignee: Caterpillar Tractor Co., Peoria, Ill.

[21] Appl. No.: 690,111

[22] Filed: May 26, 1976

Related U.S. Application Data

[63] Continuation of Ser. No. 513,735, Oct. 10, 1974, abandoned.

[51] Int. Cl.² .............................................. F16H 1/44
[52] U.S. Cl. ..................................................... 74/711
[58] Field of Search ..................... 74/710.5, 711, 760; 192/57, 85 AA

[56] References Cited

U.S. PATENT DOCUMENTS 3,215,003   11/1965   Gorshkoff .............................. 74/760

*Primary Examiner*—Samuel Scott
*Assistant Examiner*—Frank H. McKenzie, Jr.
*Attorney, Agent, or Firm*—Phillips, Moore, Weissenberger, Lempio & Majestic

[57] ABSTRACT

A limited slip differential comprises juxtaposed axle gears rotatably mounted in a carrier meshing with planet gears arranged in staggered pairs and also rotatably mounted in a carrier. A hydraulically actuated friction clutch is positioned between the carrier and floating ring gear, which is meshed to certain of the planet gears, to retard rotation of the planet gears in response to a rotational speed differential of the axle gears. Control means for automatically actuating the clutch comprises a plurality of pistons reciprocably mounted in one axle gear and a cam surface attached to the other axle gear for pressurizing, in response to a rotational speed differential of the axle gears, the actuating chambers of the clutch.

5 Claims, 4 Drawing Figures

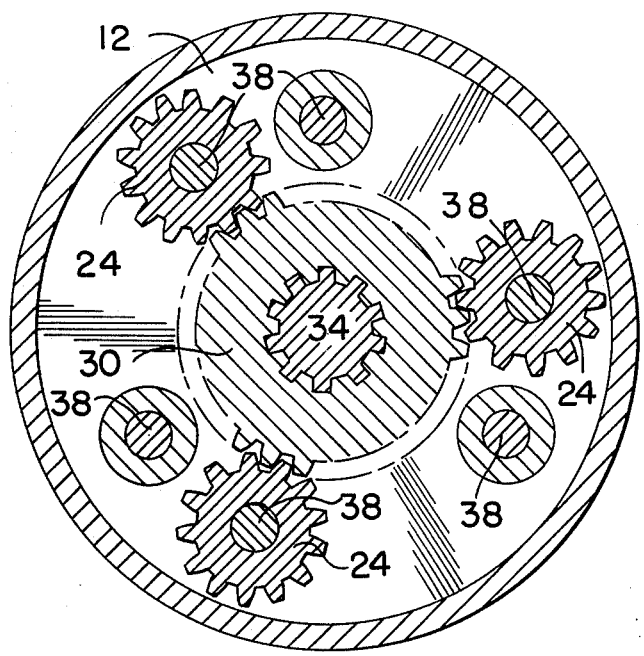
Fig_3_
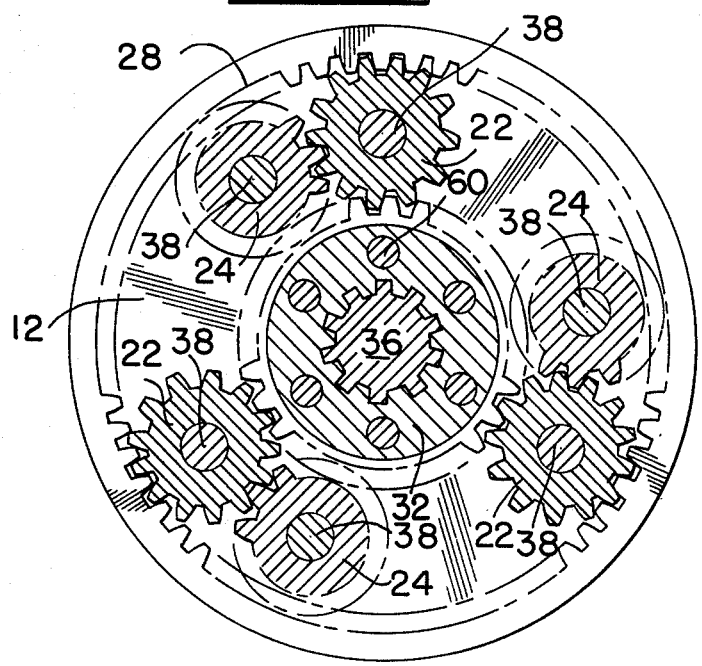
Fig_4_

LIMITED SLIP DIFFERENTIAL WITH CLUTCH CONTROL MEANS

This is a continuation, of Ser. No. 513,735, filed Oct. 10, 1974 now abandoned.

BACKGROUND OF THE INVENTION

This invention relates to a differential for wheeled vehicles and more particularly relates to a limited slip differential of the automatic clutch controlled variable resistance type.

Conventional differentials normally depend on frictional drag inherently created therein or on attendant devices, such as pre-loaded clutch packs associated with the axle gears or positive lockup devices, to transfer drive torque to a non-slipping wheel during vehicle operation. The torque transfer capacity in such differentials is normally limited and often times proves insufficient to adequately propel the vehicle when its wheels encounter unbalanced traction conditions. Latter limited slip differentials have included means of transferring high torque to a non-slipping wheel during vehicle operation, but these devices have been complex and as a result prone to failure. Of general interest are U.S. Pat. Nos. 1,750,981; 2,894,416; 2,985,035; 3,077,835; 3,109,323; 3,158,042; 3,229,550; 3,237,483; and 3,724,289.

SUMMARY OF THE INVENTION

In accordance with the above discussions, an object of this invention is to provide a relatively simple and compact limited slip differential for automatically sensing differential motion of the axle gears of a wheeled vehicle and automatically creating a resistive force of high torque for retarding the motion thereby.

Another object of this invention is to provide a unique automatic control means for the efficient creation of the desired magnitude of frictional resistance to wheel slip during selected phases of differential operation.

A still further object of this invention is to create driving torque as a function of frictional resistance and efficient coupling of this torque by way of a unique arrangement of planet gears and a floating ring gear, to the drive axles to retard thereby axle differential rotation and thus restrict wheel slip.

Still another object of this invention is to minimize any adverse centrifugal effects on the differential control means caused by system rotation.

Broadly stated, the present invention is a differential unit comprising a pair of coaxially juxtaposed axle gears, each mounted on a rotatably mounted drive axle. The differential contains a carrier mounted in the differential for rotation relative to the drive axle. Further, the differential comprises planet gear means rotatably mounted to said carrier to mesh with the axle gears for differentially permitting one axle gear to rotate faster than the other axle gear. The differential also contains means operatively associated with the carrier and gear means for lessening differential rotation of the one axle gear relative to the other axle gear. Further, the differential comprises control means for actuating the means operatively associated with the carrier and gear means.

BRIEF DESCRIPTION OF THE DRAWINGS

Other objects of this invention will become apparent from the following description and accompanying drawings wherein:

FIG. 3 is an enlarged sectional view taken along the line III-III in FIG. 1; and FIG. 4 is an enlarged sectional view taken along the line IV-IV in FIG. 1.

DESCRIPTION OF THE PREFERRED EMBODIMENT

Figure 1:
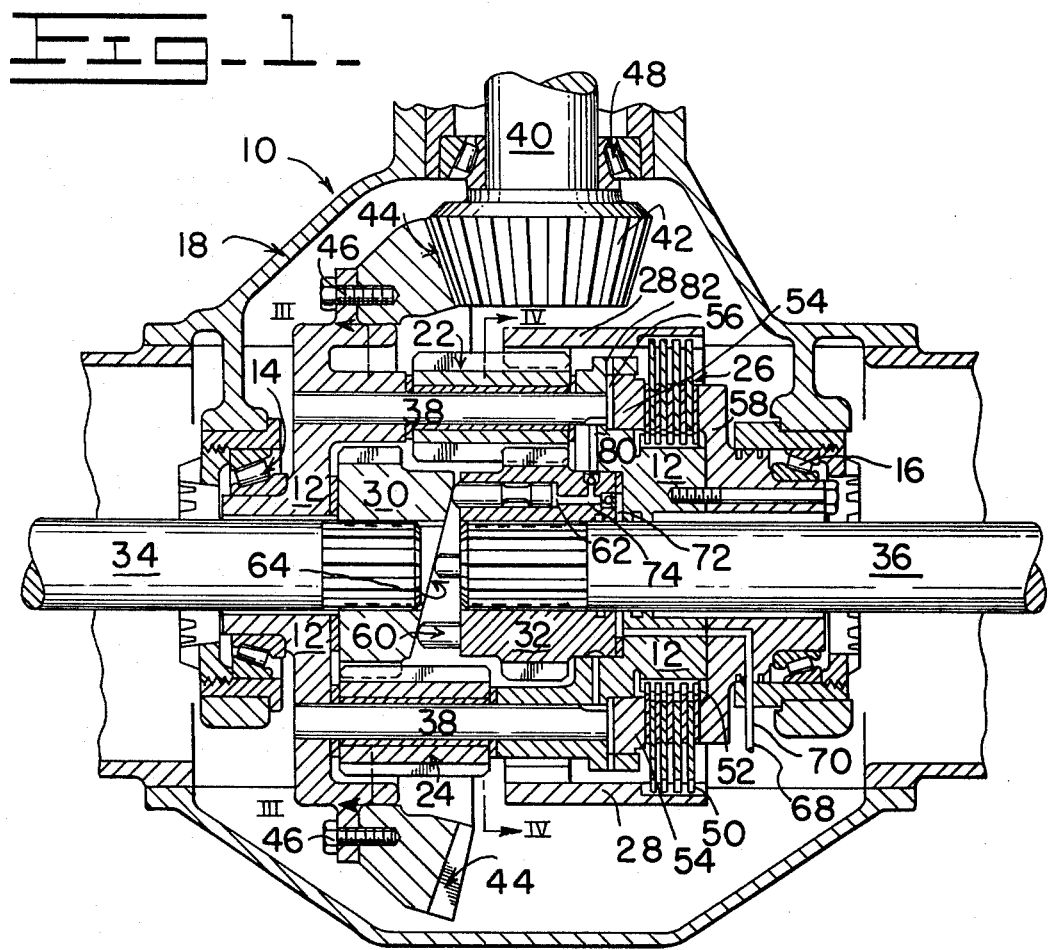
FIG. 1 is a cross sectional view of a limited slip differential embodying novel aspects of this invention therein.

Referring to FIG. 1, the present embodiment of this invention is a differential 10 which consists of a carrier assembly 12 rotatably mounted with roller bearing assemblies 14 and 16 in a housing 18. The housing 18 is non-rotatably mounted on a vehicle in a conventional way. The differential 10 also comprises six (6) identical planet gears, two of which are shown at 22 and 24, a clutch assembly 26, a floating ring gear 28, and a pair of coaxially juxtaposed differential axle gears 30 and 32 splined to drive axles 34, and 36 respectively. The planet gears 22 and 24 are rotatably mounted on pins 38 which are secured to the carrier 12. The planet gears 22,24 are arranged in staggered pairs to mesh with each other in the center half of each gear and in turn to mesh with either axle gear 30 or axle gear 32. In the present embodiment, the planet gears 22,24 consist of three pairs of two staggered gears each, as shown in FIG. 4, arranged at equal angular intervals about the longitudinal axis of the drive axles with their axles parallel to and equidistant from the axis of the drive axles 34,36.

Referring again to FIG. 1, the drive shaft 40 penetrates the housing 18. The drive pinion 42, formed on the end of the drive shaft 40, meshes with a ring gear 44, attached by bolts 46 to the carrier 12, to transmit power to the differential 10. The roller bearing assembly 48 allows the drive shaft 40 to rotate relative to the housing 18. During normal vehicle operation, rotation of the drive shaft 40 will rotate the carrier 12 through gears 42 and 44. The carrier 12, in turn, imparts rotation to the axle gears 30 and 32 and drive axles 34 and 36 through the six identical planet gears 22,24. With axle gears 30 and 32 rotating at the same speed, the planet gears 22,24 will not rotate on the carrier 12 but will rotate as a unit about the longitudinal axis of the drive axles 34,36 along with the axle gears 30,32 and the carrier 12. Except for the housing 18 since the entire differential assembly is rotating and no relative motion exists between any members of the assembly, the torque which is produced by the drive shaft 40 and pinion 42 is divided equally to the axles 34 and 36. However, if a lower resistance is encountered by either wheel, then the axle gear attached to the axle of that wheel will speed up. Assuming that the wheel which is attached to axle 34 is the one that begins to spin, then gear 30 will speed up and begin to rotate relative to the differential assembly. Since gear 30 and gear 32 are interconnected by means of the planet gears 22,24, gear 32 will be driven backwards relative to the carrier 12, and gear 32 will slow down or possibly stop. When this differential motion occurs, all the planet gears 22,24 will rotate on their pins 38 and all of the gears of the differential assembly 10 will rotate relative to the carrier assembly 12 to accommodate such differential action. This differential motion allows the spinning wheel to continue to spin while the wheel attached to axle 36 remains stationary and all of the torque is transferred to the axle 34 and the attached spinning wheel. The vehicle is thus at a stand-still and the differential motion being experienced must be stopped in order to get the vehicle moving again.

The present invention relates primarily to the means for the efficient transferring of torque to the non-spinning wheel, to thereby stop or at least lessen this excessive and undesirable differential motion. These means include the use of planet gears 22,24, the use of a floating ring gear 28 as the means for associating the planet gears 22,24 with clutch means, the type of clutch means and the control means for controlling the degree of actuation of the clutch means.

The clutch means in the present invention requires only one multiple disc clutch assembly 26 wherein the outer interleaved clutch discs 50 are splined on their outer periphery to the floating ring gear 28 while the inner interleaved clutch discs 52 are splined on their inner periphery to the carrier 12. If so desired, the clutch discs 50,52 can be more numerous and preferably thinner to increase thereby the clutching strength. An annular piston 54 is reciprocably mounted in an annular chamber 56 to selectively compress the clutch discs together against a clutch backup plate 58 to control the degree of actuation of the clutch 26.

The control means of the differential 10 comprises differential rotation speed responsive means for generating pressurized fluid, which is then communicated to the clutch actuating chamber 56. The speed responsive means comprises pump means which operate in response to the differential rotation of the drive axles. The pressure of the fluid generated by the pump means is a function of the speed of the differential rotation.

Figure 2:
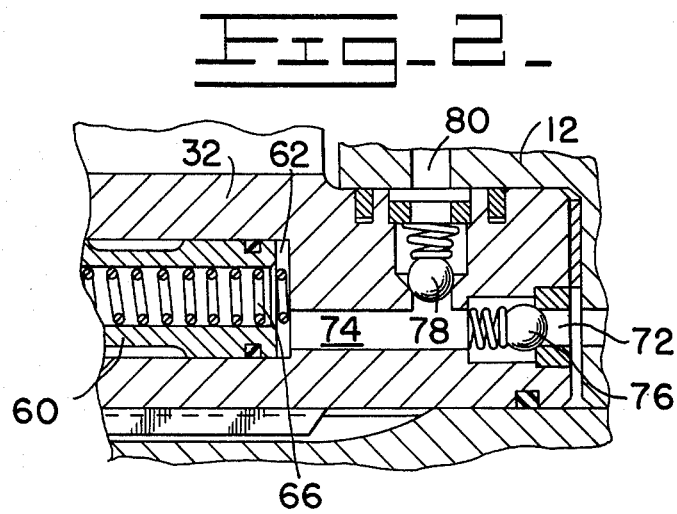
FIG. 2 is an enlarged sectional view of the differential of FIG. 1 showing a portion of the novel control means for clutch hydraulic actuation.

Referring to FIGS. 1 and 2, the pump means consists of a plurality of pump pistons 60 reciprocably mounted parallel to the drive axle axis in bores 62 formed in the axle gear 32. The pistons 60 are forced to be continuously against the cam face 64 of axle gear 30 by means of a spring 66 (as shown in FIG. 2). Therefore, when differential rotation occurs, the cam face 64 causes the pump pistons 60 to reciprocate in the bores 62 since the cam 64 is rotating relative to the pistons 60. This reciprocating action pressurizes the hydraulic fluid for communication to the clutch actuating chamber 56. As can be seen, the higher the speed of differential rotation, in either direction, the higher is the pressure of the hydraulic fluid. Also, the mounting of the pump pistons 60 axially, as described herein, prevents any centrifugal effects caused by axle or carrier rotation from affecting adversely piston 60 operation or fluid flow.

The hydraulic fluid is supplied to the bores 62 from a low pressure oil supply 68 by means of passages 70 and 72 and check valve 76. As the pistons 60 reciprocate, the fluid in the cavity 62 and passage 74 is pressurized and check valve 76 is forced closed while check valve 78 is forced open. The pressurized fluid then flows across check valve 78 and into passage 80 and from there into the clutch actuating chamber 56, thereby causing clutch piston 54 to engage the clutch assembly 26. As the clutch assembly 26 is engaged by the compressive force between the axle gears 30,32 and the carrier 12 is restrained due to the locking action of the floating ring gear 28 and carrier 12, as previously mentioned. Once the clutch 26 is fully engaged, differential motion stops. Referring again to our above example of differential rotation caused by the spinning of the wheel connected to the axle gear 30, the reaction torque in this case when the clutch 26 engages is transferred to gear 32, causing it to drive up to its full torque value, thereby turning the wheel which is attached to axle 36. In this way, differential motion is caused to cease. However, once the differential motion ceases, the pumping action also stops. The clutch 26, therefore, will begin to disengage as the pressurized fluid drains from the clutch actuating chamber 56 via orifices 82.

The volume of oil directed to the clutch actuating chamber 56 is primarily determined by the relative speed or rotation occurring as between the drive axles 34,36, as mentioned previously. In order to provide a more accurate control of the fluid pressure build up on the clutch actuating chamber and to permit quick bleed down thereof when differential action ceases, orifices 82 are suitably sized in relation to to the volumetric capacity of the low pressure oil supply 68 and the displacement of pump pistons 60 to provide a controlled pressure bleed-off for a given amount of differential action.

Therefore, in the case where a poor traction condition continues to exist, differential motion again takes place and the clutch 26 will be pressurized again by the action of the pump means, as previously described. This alternate engaging and disengaging of the clutch assembly 26 will continue as long as one wheel experiences lower resistance than the other. In continuously bad-footing conditions, a fairly steady slow differential speed will occur as a function of the orifices 82 with the pump means pumping just enough pressurized fluid to maintain the required pressure on the clutch assembly 26. In this way, a steady torque force can be applied to the wheel which is on good traction and the vehicle will continue to move.

As has been described, all essential elements for limiting the differential action and for release of the locking mechanisms are self-contained within the differential assembly. No separate control of the locking or the unlocking of the action is possible — or in this case desirable — by the vehicle operator.

What is claimed is:

1. A new differential comprising:
  a pair of coaxially juxtaposed axle gears, each mounted on a rotatably mounted drive axle;
  a carrier mounted in said differential for rotation relative to the drive axles;
  a plurality of first planet gears rotatably mounted on the carrier, each being in meshing engagement with one of the axle gears;
  a plurality of second planet gears rotatably mounted on the carrier, each being in meshing engagement with the other of the axle gears and with the first planet gears;
  a floating ring gear engaging one of said plurality of planet gears and mounted for rotation thereabout;
  a fluid pressure actuable clutch means for coupling the ring gear to the carrier;
  cam means rotatable with one of the axle gears,
  fluid piston pump means engaging said cam means and rotatable with the other axle gear; and
  fluid passage means communicating the fluid piston pump with the clutch means,
  whereby relative rotation between the axle gears causes the fluid piston pump means to be actuated by the cam means to communicate fluid pressure to the clutch to actuate the clutch to resist relative rotation of the carrier and ring gear.

2. The differential of claim 1 wherein said clutch means comprises:

a plurality of interleaved outer and inner clutch discs, said outer clutch discs splined on their outer periphery to said floating ring gear, said inner clutch discs splined on their inner periphery to said carrier;

an annular clutch backup plate mounted on said carrier and positioned on one side of said clutch discs; and a fluid actuated annular piston reciprocally mounted in an annular chamber defined in said carrier, said fluid passage means being connected thereto, said annular piston positioned on the other side of said clutch discs from said clutch backup plate to cause said clutch discs to compress together against said clutch backup plate as a function of the degree of actuation of said annular piston, whereby said annular piston is caused to actuate and to increase the degree of actuation of said clutch discs as a function of increasing fluid pressure communicated to said annular chamber, said increasing fluid pressure having been generated by said fluid piston pump means during increasing differential rotation between said coaxially juxtaposed axle gears.

3. The differential of claim 2 further comprising fluid orifice means for continually bleeding off a given amount of fluid from said annular chamber such that as said differential rotation between said axle gears is caused to decrease, said orifice means causes the fluid pressure in said annular chamber to decrease to thereby allow said clutch means to disengage.

4. The differential of claim 1, wherein said cam means comprises a flat cam face defined on said one axle gear in a plane that is at an angle off of a plane positioned such that it is perpendicular to the axis of said juxtaposed axle gears.

5. The differential of claim 4 wherein said pump means comprises:
a pump body defining a plurality of bores, a plurality of pistons mounted in said bores, and spring means for abutting the pistons to said cam face thereby generating reciprocating action in response to relative rotation between said axle gears.

* * * * *